United States Patent

Blouch

[15] 3,677,231

[45] July 18, 1972

[54] LIVESTOCK DRINKING DEVICE

[72] Inventor: Ronald S. Blough, Fairfield, Iowa
[73] Assignee: Fairfield Engineering & Manufacturing Company, Fairfield, Iowa
[22] Filed: Aug. 3, 1970
[21] Appl. No.: 60,672

[52] U.S. Cl. ............................................................119/75
[51] Int. Cl. .........................................................A01k 07/00
[58] Field of Search ...........................................119/72.5, 75

[56] References Cited

UNITED STATES PATENTS

| | | | |
|---|---|---|---|
| 3,179,085 | 4/1965 | McKillip, Jr. | 119/75 |
| 3,550,560 | 12/1970 | Edstrom | 119/72.5 |
| 3,126,873 | 3/1964 | Mikaelsen | 119/75 |

FOREIGN PATENTS OR APPLICATIONS

| | | |
|---|---|---|
| 1,050,131 | 4/1953 | France |
| 1,204,451 | 11/1965 | Germany |

*Primary Examiner*—Hugh R. Chamblee
*Attorney*—Wolfe, Hubbard, Leydig, Voit & Osann, Ltd.

[57] ABSTRACT

An animal watering device for hogs or the like adapted to connect to a source of water. The device includes a housing having a passageway with a valve means therein that is operated by an adjustable valve operator. The valve operator is partially positioned in a downwardly inclined spout that has outwardly extending web elements. The animal bites the spout and valve operator to open the valve means permitting the animal to drink the water. The web elements preclude operation of the device from any position other than substantially directly in front of it.

10 Claims, 7 Drawing Figures

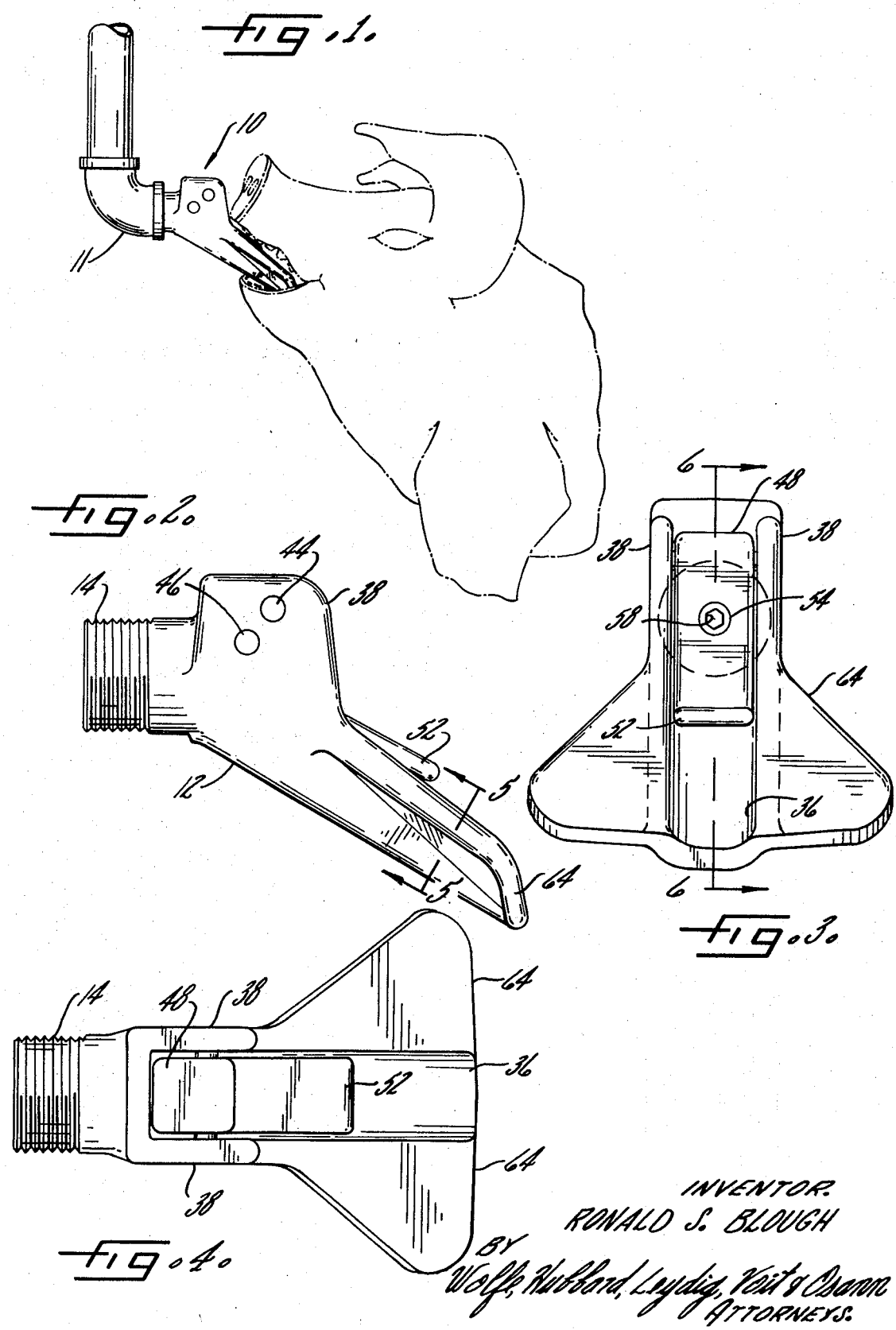

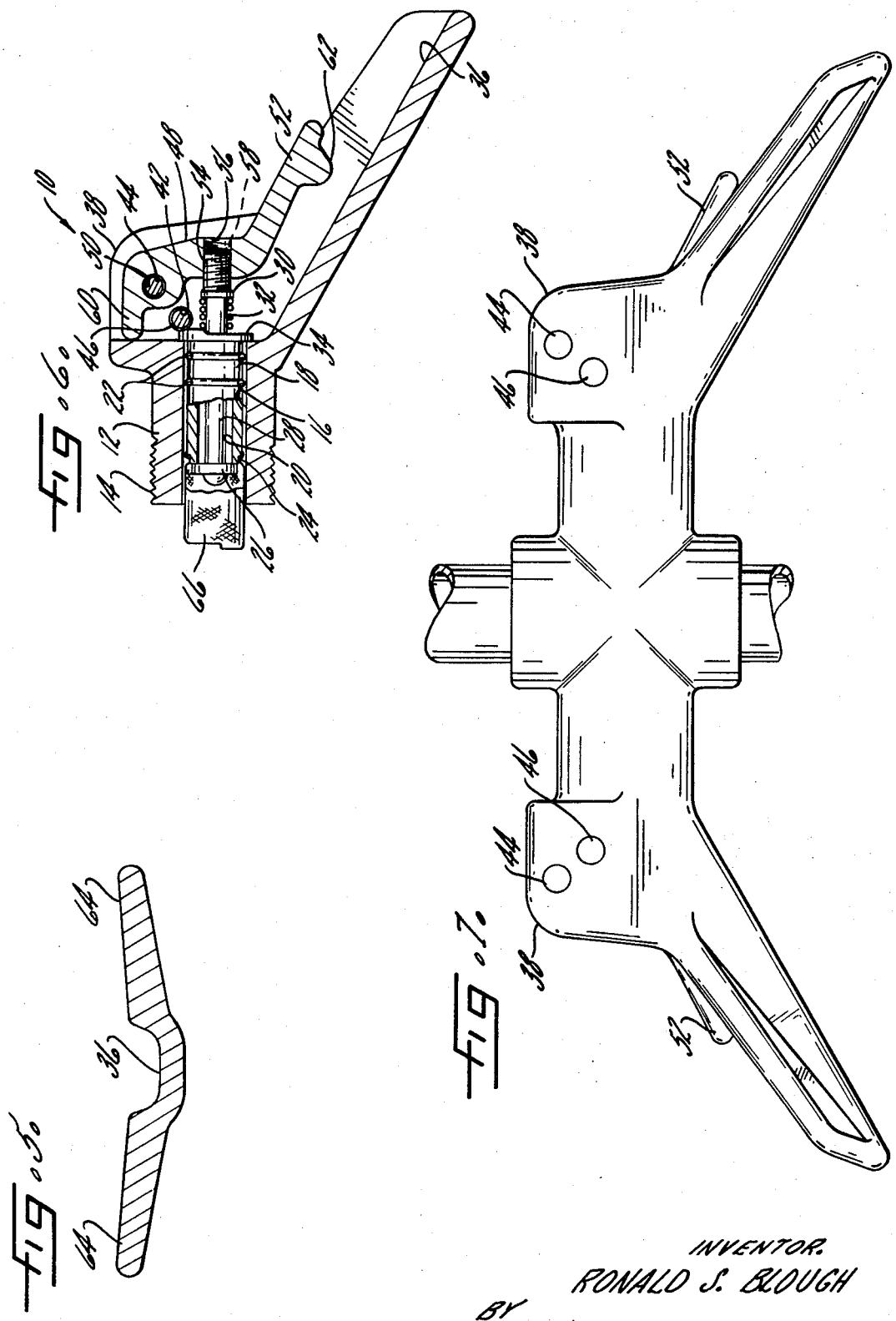

LIVESTOCK DRINKING DEVICE

BACKGROUND OF THE INVENTION

This invention relates to an animal watering device, and is particularly suited for watering hogs and the like.

As the agricultural industry, including the animal feeding and finishing segment of that industry, continues to be faced with severe economic hardships, new products and methods that will reduce operating costs are a practical necessity. In the feeding and finishing of hogs and pigs, it has been found to be advantageous to fatten and finish them in well-lighted and well-ventilated building that are kept clean, sanitary and dry.

Watering devices that have recently been marketed have attempted to limit the amount of water made available to hogs to the amount they will drink. Because feeders and finishers now add vitamin and nutrient supplements, as well as relatively expensive medicinal additives to water supplies, it is essential that water waste be kept to a minimum.

Recent developments have included a relatively small bowl or reservoir from which the animal drinks, with the water being supplied to the bowl either automatically through a float operated valve or through a valve operated by the animal with its nose. However, such devices, while limiting the amount of waste, still have the attendant problems of freezing, contamination, cleaning and waste. Another recent device includes a spout having a depressable actuator operating a valve which allows a hog to drink by biting the spout and actuator to open the valve enabling the water to flow directly into its mouth. Hogs, however, have been sufficiently intelligent to move to the side of such devices to bite them, thereby permitting a great quantity of water to flow onto the ground forming a puddle of water that they can wallow in with delight.

Accordingly, it is an object of the invention to provide a drinking device that enables hogs to drink all of the water they require but does not permit them to waste water.

Another object is a watering device that has no bowl or reservoir, thereby eliminating the attendant problems associated with such devices.

Another object is a watering device that cannot be operated from the side, thereby insuring that water flowing from the device enters the mouth of the hog.

Another object is to provide a watering device that can be easily adjusted to operate with typical water supply pressures and to provide a watering device that is relatively simply and economically manufactured, as well as easily installed.

Other objects and advantages of the present invention will become more readily apparent upon reading the following detailed description and upon reference to the attached drawings, in which:

FIG. 1 is a side view of the installed watering device and showing a hog in position to enable it to operate the device.

FIG. 2 is a side view of the watering device in accordance with the present invention;

FIG. 3 is an end elevation of the device shown in FIG. 2;

FIG. 4 is a top view of the device shown in FIG. 2;

FIG. 5 is a sectional view of the device taken along line 5—5 of FIG. 2;

FIG. 6 is a sectional view of the device taken along the line 6—6 of FIG. 3; and FIG. 7 is a side elevation of a modification of the invention including two opposed watering devices having integrally formed housing for connection to a single water supply.

DESCRIPTION OF THE PREFERRED EMBODIMENTS

While the invention will be described in connection with the preferred embodiments, it will be understood that the invention is not limited to those embodiments, and that suitable modifications, alterations and equivalents may be included within the spirit and scope of the invention.

Referring now to FIG. 1 of the drawings, a hog is shown in position to take a drink of water from the drinking device, indicated generally at 10, which is connected to a conduit fitting 11 that communicates with a supply of water.

For the hog to receive water, it must bite portions of the device to operate a valve within it. As will be clearly described hereinafter, the hog is only able to operate the device while standing directly in front of it with its head raised as shown so that any water flowing through the device will pass into the hog's mouth rather than onto the floor or ground.

To insure proper operation by the hog, the device should be mounted at an elevation slightly higher than the elevation of the hog's back, so that it is required to lift its head to take a drink of water.

Turning now to the preferred embodiment of the present invention and referring to FIGS. 2 through 6, the watering device includes a body or housing 12 that may have a cylindrical threaded portion 14 for connection to a conduit coupling 11 that is in communication with a water supply (not shown).

To permit water to flow through the device, a passageway 16 is provided in the housing 12. Within the passageway 16 is a hollow cylindrical insert 18 having a passageway 20 therethrough. To have a snug fit between the insert 18 and the passageway 16, the outer diameter of the insert is only slightly smaller than the inside diameter of the passageway and sealing annular O-rings 22 are positioned to prohibit the passage of water between the insert and the passageway 16. The inner end surface of the insert 18 provides a seat 24 for a valve member 26 that is attached to a valve rod 28. The rod 28 extends through the passageway 20 and has an outwardly extending annular flange 30 to provide a seat for a spring means 32 which operates to keep the valve member 26 seated on seat 24 except when the device is being operated. The opposite end of the spring means 32 rests upon an annular flange 34 which is a part of the insert 18. The flange 34 also seats upon the housing 12 to prohibit movement of the insert 18 relative to the housing 12 when the valve rod 28 is depressed.

To direct the water into the hog's mouth, a downwardly extending channel shaped spout 36 which may be integrally formed with the body 12 is provided. The angle of the spout's incline is approximately 30° below horizontal, although this angle may be varied within limits. The angle of the spout 36, coupled with the elevation the device is mounted above the floor is important to the proper operation of the device for reasons that will more fully be described later. The housing may have extensions 38 of the sides of the spout 36, with the extensions having pairs of apertures 40 and 42 for receiving cotter pins 44 and 46 or the like.

To operate the device, a valve operator 48 is partially positioned within the spout and has an aperture 50 through which cotter pin 44 provides pivotal securement. Specifically, the valve operator 48 has a tongue portion 52 within the channel shaped spout, with its upper surface slightly higher than the sides of the spout as is clearly shown in FIG. 2. To take a drink of water, a hog must depress the valve operator 48 by biting on the tongue portion 52 while having its lower jaw under the spout.

Adjustment of the amount of water flowing from the device is achieved by a threaded set screw 54 or the like that is variably positioned in the threaded aperture 56 in the valve operator 48. The adjustment may be necessary to compensate for the particular water pressure of a water supply. For convenient adjustment, the set screw 54 may have a depression 58 for receiving an alan wrench (as shown), or it may be adapted to receive a screwdriver or the like. The operating member 48 additionally has a flange 60 which will contact the cotter pin 46 in the event the tongue portion 52 is raised. This acts as a stop to prevent possible damage to the device in the event the tongue portion 52 is raised. The tongue portion additionally has a cusp 62 on its lower surface that contacts the bottom of the spout and acts as a stop when the tongue portion 52 is depressed.

As previously mentioned, the elevation that the device is mounted above the floor is important to its proper operation and should be slightly higher than the elevation of the top of the hog's back. This requires the hog to raise its head to bite the tongue portion 52 and trough 36 to open the valve. Recognizing that all hogs are not the same size, some leeway in the mounting elevation is of course available. It has been found that in a watering device of a single size, mounted at an elevation slightly higher than the back of an average sized feeder hog has functioned properly. Because sows are often much larger than feeder hogs, it may be advantageous to manufacture a larger device for them and to correspondingly mount the device at a higher elevation.

To prohibit operation of the device by a hog standing to the side of the device, substantially laterally extending web elements 64 are provided. The web elements 64 are shown to extend increasingly outwardly as they approach the end of the spout 36, although other configurations may be used. As is shown in FIG. 5, the web elements 64 are also slightly upwardly directed as well.

The purpose of the web elements is to preclude a hog from biting the tongue portion 52 while standing to the side of the device, which, if possible, would allow water to run onto the floor rather than into the hog's mouth. The presence of the web elements 64 precludes the hog from depressing the tongue portion 52 because its rear teeth contact the web elements before it can make contact with the tongue portion, and it is therefore not able to depress the tongue portion. The hog soon learns that the only way water can be gained from the device is to approach the spout 36 from the front. Thus, the water will flow down the spout into the hog's mouth, rather than onto the floor. It is also important that the outer end of the tongue portion 52 terminates short of the end of the spout 36 for the web elements to be effective. The length of the tongue portion 52 shown in FIGS. 2 and 6 is approximately one-half the length of the spout, and this requires the hog to take a considerable portion of the spout 36 into its mouth to reach the tongue portion 52.

To prevent any dirt or other foreign matter from passing through the device from the water supply, a filter 66 is provided to encase the filter member 26 and prevent the matter from being consumed by the hog.

Referring to FIG. 4, a modification of the invention is illustrated in which two watering devices of the type shown in FIG. 1 are combined opposite one another, using an integral one-piece housing. The advantage of this combination is a lower installation cost due to the fact that fewer pipe fittings will probably be required.

I claim as my invention:

1. A drinking device for hogs and the like, comprising:
   a valve body having a water passage therethrough,
   a valve located in said passage and having a valve stem projecting from one end of said passage,
   an elongated, generally channel-shaped drinking spout extending outwardly from said valve body and inclined downwardly from said passage,
   a valve operator pivotally mounted on said valve body for engaging said valve stem and opening said valve,
   said valve operator having a tongue portion disposed in said channel-shaped spout such that it may be depressed by a hog biting said spout and operator with its mouth substantially aligned with and partially encircling said spout and operator in order to receive the water discharged from said spout in its mouth,
   and means in the form of laterally projecting web elements disposed laterally on opposite sides of said spout for preventing a hog from depressing said operator by biting said spout and operator from either side when its mouth is not aligned to receive the water discharged from said spout, said web elements diverging laterally outwardly from adjacent said valve body to adjacent the end of said spout and disposed to be engaged by the rear teeth of a hog attempting to bite said spout and operator from the side before the hog can depress said operator.

2. A drinking device as defined in claim 1 wherein said web elements diverge slightly upwardly as said web elements diverge outwardly from said spout.

3. A drinking device as defined in claim 1 wherein said spout is formed integrally with said valve body and said web elements are formed integrally with said spout.

4. A drinking device as defined in claim 1 wherein said valve body is formed with a channel-shaped end portion which merges into said channel-shaped spout and said valve operator is pivoted on pin means extending between the legs of said channel-shaped end portion.

5. A drinking device as defined in claim 1 including means for adjusting the opening of said valve.

6. A drinking device as defined in claim 5 wherein said adjusting means is in the form of an adjustable screw carried by said valve operator for engaging said valve stem.

7. A drinking device as defined in claim 1 including stop means removably associated with said body, with said stop means contacting said valve operator to prevent upward movement of said outer end portion of said valve operator past a predetermined position.

8. A drinking device as defined in claim 1 wherein said valve body is formed with a supply port communicating substantially at right angles with said passage and said drinking device includes a second drinking spout and projecting web elements, similar to those previously recited, extending outwardly from said valve body and inclined downwardly from the other end of said passage in which a second valve and valve operator are disposed.

9. A drinking device as defined in claim 8 wherein each of said spouts is inclined downwardly at an angle of about 30° from said passage and said web elements diverge laterally outwardly from adjacent said valve body to adjacent the end of said spouts.

10. A drinking device as defined in claim 9 wherein each of said spouts is formed integrally with said valve body and said web elements are formed integrally with said spouts.

* * * * *